(12) United States Patent
Bremer et al.

(10) Patent No.: US 10,521,699 B2
(45) Date of Patent: Dec. 31, 2019

(54) MULTI-SCALE DEEP LEARNING SYSTEM

(71) Applicant: Lawrence Livermore National Security, LLC, Livermore, CA (US)

(72) Inventors: Peer-Timo Bremer, Livermore, CA (US); Hyojin Kim, Livermore, CA (US); Jayaraman J. Thiagarajan, Livermore, WA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 108 days.

(21) Appl. No.: 15/782,771

(22) Filed: Oct. 12, 2017

(65) Prior Publication Data

US 2019/0114510 A1  Apr. 18, 2019

(51) Int. Cl.
| | | |
|---|---|---|
| G06K 9/62 | (2006.01) | |
| G06K 9/20 | (2006.01) | |
| G06K 9/46 | (2006.01) | |
| G06T 7/143 | (2017.01) | |

(Continued)

(52) U.S. Cl.
CPC ......... *G06K 9/6259* (2013.01); *G06K 9/2054* (2013.01); *G06K 9/46* (2013.01); *G06K 9/6269* (2013.01); *G06K 9/6277* (2013.01); *G06N 7/005* (2013.01); *G06T 7/11* (2017.01); *G06T 7/143* (2017.01); *G06T 2200/04* (2013.01); *G06T 2207/20021* (2013.01); *G06T 2207/20076* (2013.01); *G06T 2210/12* (2013.01)

(58) Field of Classification Search
CPC ...... A63F 13/327; A63F 13/213; A63F 13/25; A63F 13/32; A63F 13/332; A63F 13/335; A63F 13/655; A63F 13/00; G06T 7/55; G06T 3/0068; G06T 15/04; G06T 7/0012; G06T 7/143; G06T 7/11; G06K 9/00228; G06K 9/6289; G06K 9/2054; G06K 9/46; G06K 9/6269; G06K 9/6277; G06K 9/6259; G06N 3/02; G06N 3/08; G06N 7/005; G06N 20/00; G06N 3/084
See application file for complete search history.

(56) References Cited

U.S. PATENT DOCUMENTS

| | | | |
|---|---|---|---|
| 2015/0208021 A1* | 7/2015 | Cho ..................... | G11B 27/327 386/230 |
| 2016/0005183 A1* | 1/2016 | Thiagarajan ........... | A61B 5/055 382/131 |

OTHER PUBLICATIONS

Kim, Hyojin et al., "Image Segmentation using Consensus from Hierarchical Segmentation Ensembles," IEEE International Conf. on Image Processing ("ICIP"), Oct. 2014, pp. 3272-3277.

\* cited by examiner

*Primary Examiner* — Duy M Dang
(74) *Attorney, Agent, or Firm* — Perkins Coie LLP

(57) ABSTRACT

A system for identifying objects in an image is provided. The system identifies segments of an image that may contain objects. For each segment, the system generates a segment score by inputting to a multi-scale neural network windows of multiple scales that include the segment that have been resampled to a fixed window size. A multi-scale neural network includes a feature extracting convolutional neural network ("feCNN") for each scale and a classifier that inputs each feature of each feCNN. The segment score indicates whether the segment contains an object. The system generates a pixel score for pixels of the image. The pixel score for a pixel indicates that that pixel is within an object based on the segment scores of segments that contain that pixel. The system then identifies the object based on the pixel scores of neighboring pixels.

34 Claims, 8 Drawing Sheets

(51) Int. Cl.
*G06N 7/00* (2006.01)
*G06T 7/11* (2017.01)

MULTI-SCALE DEEP LEARNING SYSTEM

STATEMENT REGARDING FEDERALLY SPONSORED RESEARCH

The United States government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

In many environments, there is a need to identify regions of interest within an image. For example, in an airport, an image generated from a scan of a bag may need to be analyzed to determine whether the bag contains any prohibited objects (i.e., regions of interest). As another example, in a medical environment, an image generated from a scan of a patient may need to be analyzed to determine whether the patient has a tumor. The scanning technology may be computed tomography ("CT"), and the images may be three-dimensional ("3D") images.

Convolutional neural networks ("CNNs") are a type of neural network that has been developed specifically to process images. A CNN may be used to input an entire image and output a classification of the image. For example, a CNN can be used to automatically determine whether a scan of a patient indicates the presence of a tumor. A CNN has multiple layers such as a convolution layer, a rectified linear unit ("ReLU") layer, a pooling layer, a fully connected ("FC") layer, and so on. Some more complex CNNs may have multiple convolution layers, ReLU layers, pooling layers, and FC layers.

A convolution layer may include multiple filters (also referred to as kernels or activation functions). A filter inputs a convolution window of an image, applies weights to each pixel of the convolution window, and outputs an activation value for that convolution window. For example, if the image is 256 by 256 pixels, the convolution window may be 8 by 8 pixels. The filter may apply a different weight to each of the 64 pixels in a convolution window to generate the activation value also referred to as a feature value. The convolution layer may include, for each filter, a node (also referred to as a neuron) for each pixel of the image assuming a stride of one with appropriate padding. Each node outputs a feature value based on a set of weights for the filter that are learned during a training phase for that node. Continuing with the example, the convolution layer may have 65,536 nodes (256*256) for each filter. The feature values generated by the nodes for a filter may be considered to form a convolution feature map with a height and width of 256. If an assumption is made that the feature value calculated for a convolution window at one location to identify a feature or characteristic (e.g., edge) would be useful to identify that feature at a different location, then all the nodes for a filter can share the same set of weights. With the sharing of weights, both the training time and the storage requirements can be significantly reduced. If each pixel of an image is represented by multiple colors, then the convolution layer may include another dimension to represent each separate color. Also, if the image is a 3D image, the convolution layer may include yet another dimension for each image within the 3D image. In such a case, a filter may input a 3D convolution window.

The ReLU layer may have a node for each node of the convolution layer that generates a feature value. The generated feature values form a ReLU feature map. The ReLU layer applies a filter to each feature value of a convolution feature map to generate feature values for a ReLU feature map. For example, a filter such as max(0, activation value) may be used to ensure that the feature values of the ReLU feature map are not negative.

The pooling layer may be used to reduce the size of the ReLU feature map by downsampling the ReLU feature map to form a pooling feature map. The pooling layer includes a pooling function that inputs a group of feature values of the ReLU feature map and outputs a feature value. For example, the pooling function may generate a feature value that is an average of groups of 2 by 2 feature values of the ReLU feature map. Continuing with the example above, the pooling layer would have 128 by 128 pooling feature map for each filter.

The FC layer includes some number of nodes that are each connected to every feature value of the pooling feature maps. For example, if an image is to be classified as being a cat, dog, bird, mouse, or ferret, then the FC layer may include five nodes whose feature values provide scores indicating the likelihood that an image contains one of the animals. Each node has a filter with its own set of weights that are adapted to the type of the animal that the filter is to detect.

Although CNNs are effective at classifying images, the training of a CNN can be computationally very expensive. For example, a high-resolution 3D image may contain 134,217,728 pixels (i.e., $512^3$ pixels). If the convolution layer includes eight filters, then it will include 1,073,741,824 nodes During training, each image of the training data will need to be input to the CNN multiple times and convolution windows processed for each image as the weights for the convolution layer and the FC layer are learned. Because the number of degrees of freedom and the number of images are typically very large, it would be impracticable to train such a CNN. CNNs may also have some difficulty when identifying both large and small objects within an image. For example, if a convolution window is made large to help detect large tumors, it may be difficult to also detect small tumors. It would be desirable to reduce the computational expense of training a CNN. It would also be desirable to have a CNN that could effectively and efficiently classify both large and small objects within an image.

DETAILED DESCRIPTION

Figure 1:
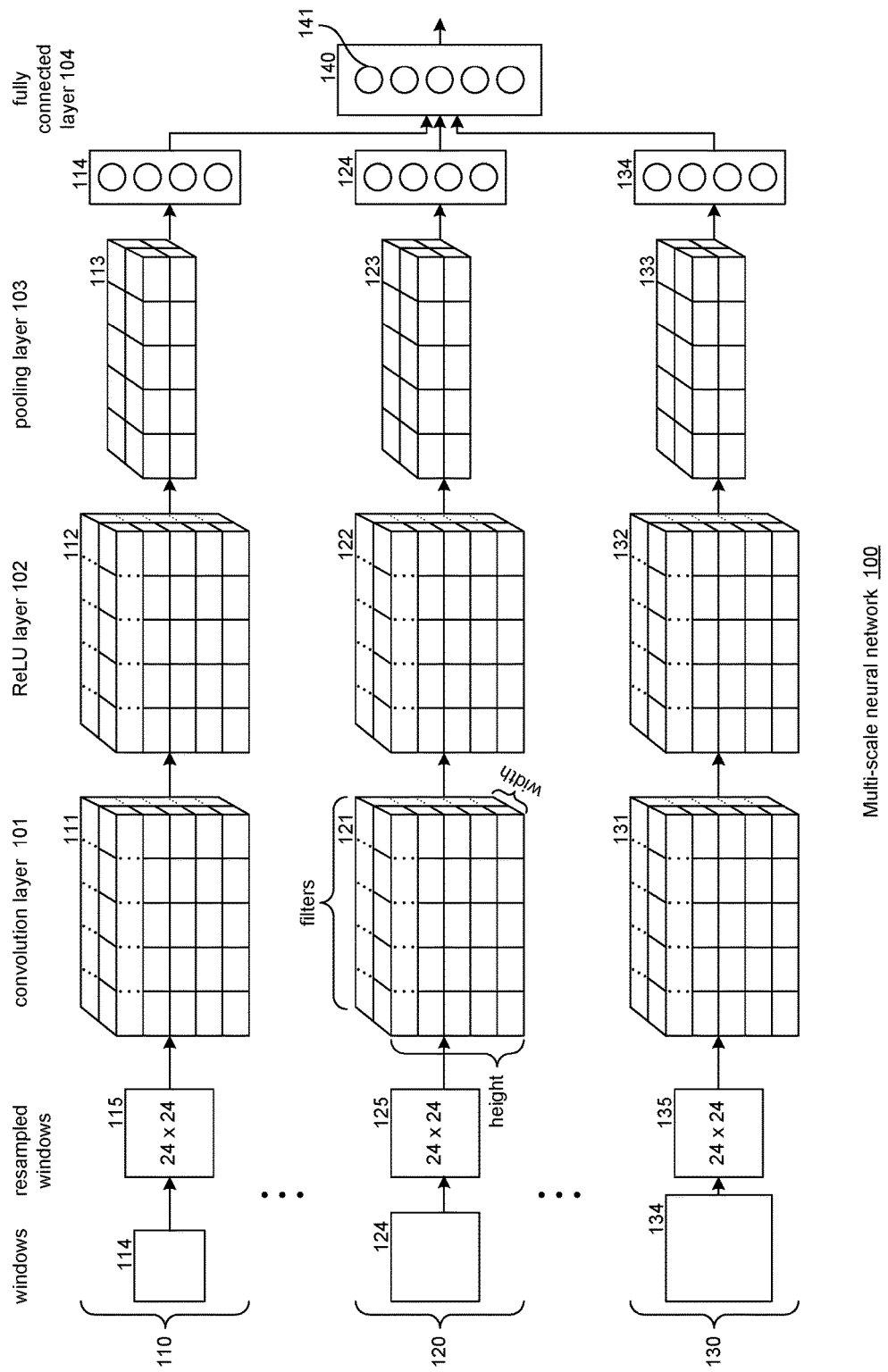
FIG. 1 is a block diagram that illustrates the architecture of a multi-scale neural network in some embodiments.

A method and system for classifying objects within images using a multi-scale neural network are provided to reduce the computational expense of classifying images and to identify both large and small objects of interest within an image. In some embodiments, a multi-scale deep learning ("MSDL") system employs a segmentation technique to first identify candidate segments (indicating possible presence of objects of interest) within an image. The candidate segments may be of varying sizes and shapes depending on the size and shape of what may be an object of interest. The MSDL system then extracts windows of various sizes that contain a segment and resamples (i.e., upsamples or downsamples) each extracted window to a fixed window size. The MSDL system them inputs the windows of the fixed window size to a CNN to classify whether the window actually contains an object of interest. Because the windows are resampled to a fixed window size, a CNN can be used for classification even though the extracted windows have different sizes and shapes. In addition, objects of interest are identified without inputting an entire image into a CNN, which significantly reduces the computational expense. Also, the extraction of windows of varying sizes that contain a segment allow for classification of based on context of the image that surrounds the segment, which can lead to improved accuracy of the classifications.

In some embodiments, the MSDL system generates a segmentation of an image to identify segments that objects of interest (e.g., possibly contain a tumor). The MSDL system then processes each segment separately to classify the segment in terms of whether it is actually an object of interest. To process a segment, the MSDL system extracts from the image windows of various window sizes that contain the segment. For example, the MSDL system may identify a bounding box for a segment and a window from the image that includes the bounding box for each window size. The window sizes may be a small size that is the size of the bounding box, a medium size that is somewhat larger than the bounding box, and a large size that is even larger. Because the window sizes are based on the size of the segment, the window sizes for different segments can be very different. To normalize the window sizes between segments, the MSDL system resamples the window to fixed window sizes. For example, if an extracted window is 32 by 32 pixels and the fixed window size is 24 by 24 pixels, then MSDL system downsamples the extracted window to the fixed window size. The MSDL system may resample the small, medium, and large window sizes to the same fixed window size or may have a small, medium, and large fixed window size.

The MSDL system then inputs the windows of the fixed window sizes for a segment into a multi-scale neural network that includes a feature extracting CNN ("feCNN") for each fixed window size and a classifier that inputs the features extracted by the feCNN to classify that segment. An feCNN is a CNN except that the last FC layer is not present or the output of the last FC layer is not used. The input that would have been provided to the last FC layer if present represents the extracted features of an feCNN. For example, the extracted features may be represented by the output of the FC layer that would be before the last FC layer. If a fixed window size is 24 by 24, an feCNN may use a convolution window that is 6 by 6 pixels. The classifier is fully connected in the sense that it inputs each feature extracted by each feCNN. The classifier then classifies the segment, for example, by outputting a score (e.g., probability) indicating how likely it is that the segment is a region of interest. The classifier may itself be a conventional FC layer except that it is fully connected to the output by each feCNN or may be some other classifier such as a support vector machine.

In some embodiments, the MSDL system may segment an image in such a way that a single pixel may be in windows generated for different segments. For example, segments may overlap, and even if the segments do not overlap, a window for one segment may contain a portion of another segment. To identify an object of interest, the MSDL system may generate a combined score for each pixel from the scores for the segments whose windows contain that pixel. Once the combined scores are generated, the MSDL system may identify an object of interest that is a group of neighboring pixels such that the combined score of each pixel in the group is above a region of interest threshold. The MSDL system may then output an indication of the regions of interest of the image. Alternatively, the MSDL system may generate multiple different segmentations of an image using a randomized approach. The MSDL system then submits each segment of the segmentations to the multi-scale neural network to classify each segment to generate probabilities that the pixels are part of an object of interest. The MSDL system then used the probabilities to identify pixels that are part of the same object of interest. Such an approach may be referred to as a consensus segmentation, as described in Kim, H., Thiagarajan, J. J., and Bremer, P. T., "Image Segmentation using Consensus from Hierarchical Segmentation Ensembles," IEEE International Conf. on Image Processing ("ICIP"), October 2014, pp. 3272-3277, which is hereby incorporated by reference.

Because the MSDL system performs CNN processing for only small portions of an image, the computational expense and needed storage is much less (e.g., by an order of magnitude) than that needed to perform CNN processing on the entire image. In addition, the MSDL system employs the different window sizes around a segment so that the characteristics of the areas surrounding a segment can be used to help classify an image. For example, it is well known that a tumor is largely characterized by the fact that it is less connected to surrounding tissue compared to a similar-looking blood vessel.

The MSDL may be trained using training data consisting of training images whose objects of interest have been labeled. The objects of interest may have been identified by identifying the approximate center location of each object of interest. For example, if the objects of interest are tumors, then the images collected by a pathology group over time that are labeled as containing tumors can be used as the training data. As another example, if the objects of interest are weapons in carry-on bags at an airport, the images collected at an airport may be labeled to indicate the locations of weapons. The MSDL system may be trained using a gradient descent method to minimize a loss function that scores the difference between the labels of the training data and the classifications generated by the MSDL system. The loss function may be based on the output of the classifier or the final output of the MSDL system after the grouping of neighboring pixels.

FIG. 1 is a block diagram that illustrates the architecture of a multi-scale neural network in some embodiments. A multi-scale neural network 100 includes feCNNs 110, 120, and 130, which are fully connected to a classifier 140. Each feCNN includes a convolution layer 101, a ReLU layer 102, a pooling layer 103, and a fully connected layer 104. Each feCNN includes some number of convolution feature maps 111, 121, and 133 generated by nodes of the convolution layer. Each convolution feature map has a height and width of 24 (assuming a stride of one). Each feCNN has one convolution feature map for each filter (e.g., five convolution feature maps per feCNN). The height and width correspond to the fixed window size of the resampled window 125, which is 24 by 24 pixels. The windows 114, 124, and 134 correspond to the small, medium, and large window sizes that encompass a segment. In this example, each of the windows 114, 124, and 134 are resampled to windows 115, 125, and 135 with a fixed window size of 24 by 24 pixels. Although not illustrated, each filter of the convolution layer that is used to generate one of the convolution feature maps includes a different set of weights that is learned during the training of the multi-scale neural network. Each feCNN also includes some number of ReLU feature maps 112, 122, and 132. Each ReLU feature map may include the same number of feature values as the corresponding convolution feature map. The feature values of the ReLU feature maps are generated by nodes of the ReLU layer. Each feCNN also includes some number of pooling feature maps 113, 123, and 133. Each pooling feature map is a downsampling of the corresponding ReLU feature map. Each feature value of a pooling feature map is generated by a node of the pooling layer. Each feCNN includes a fully connected layer 114, 124, and 134 with some number of nodes. The nodes are fully connected to the corresponding pooling feature maps 113, 123, and 133. The nodes output a feature value. The classifier 140 is fully connected in that each node 141 of the classifier 140 is connected to each feature value of the fully connected layer 104. Each node 141 is associated with a filter that has a weight for each of the feature values of the fully connected layer. Although the feCNNs are illustrated as having the same fixed window sizes and the same convolution feature map, ReLU feature map, and pooling feature map sizes, the fixed window sizes and the feature map sizes (i.e., number of nodes) can be different for each feCNN. The number of nodes in the fully connected layer of each feCNN can also be different. For example, the fixed window size for the feCNN 130 may be 32 by 16 pixels. In such a case, the height and width of the convolution feature map 131 may be 32 and 16. In contrast, the height and width of the convolution feature map 111 may be 24 and 24. The ellipses of FIG. 1 indicate that the multi-scale neural network can have any number of two or more feCNNs for different window sizes surrounding a segment and different numbers of feature values and filters. For example, a multi-scale neural network may include an feCNN for small, medium, large, very large, and extremely large window sizes. Each feCNN may also have multiple convolution layers, ReLU layers, pooling layers, and fully connected layers.

Figure 2:
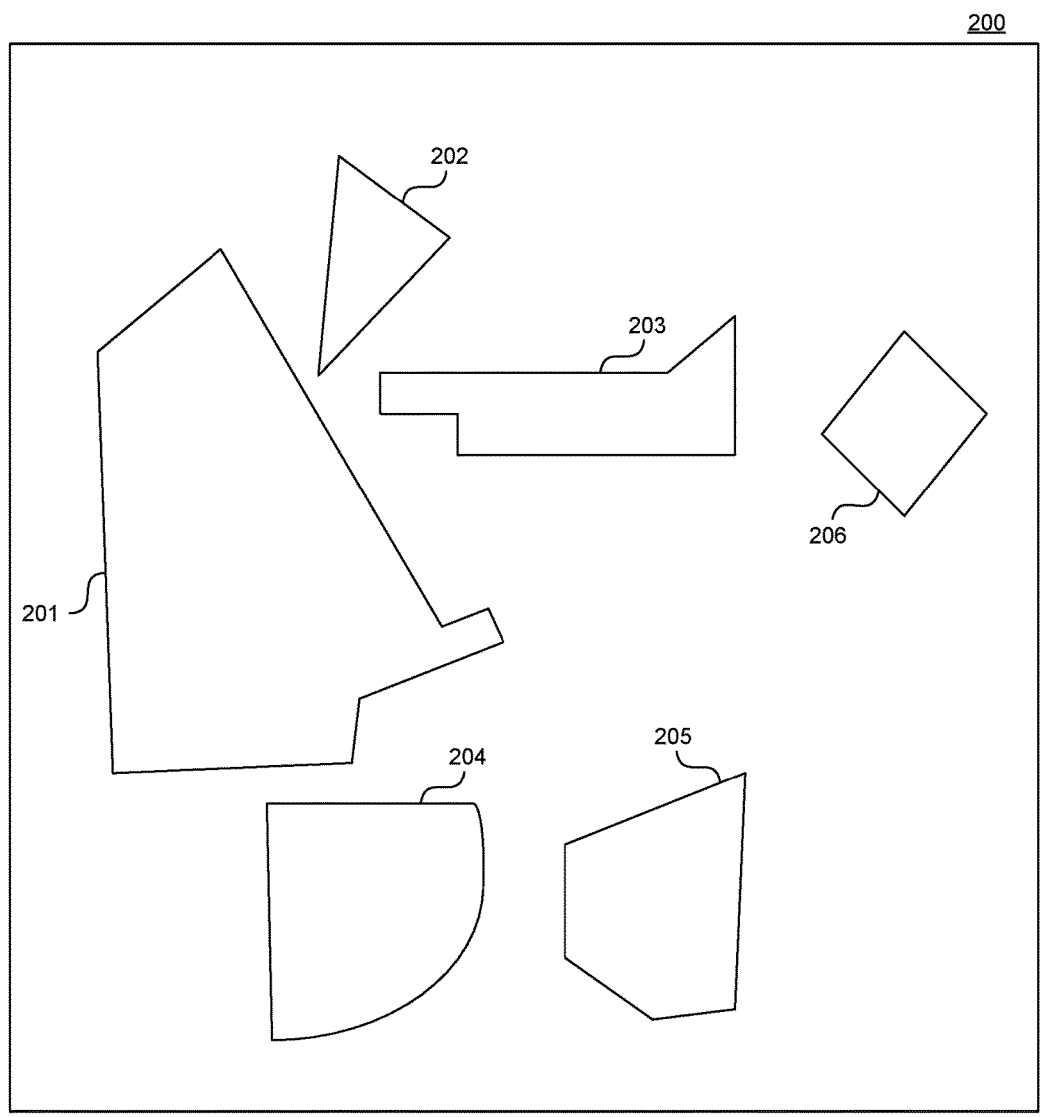
FIG. 2 illustrates a sample image in some embodiments.

FIG. 2 illustrates a sample image in some embodiments. A sample image 200 may include various objects 201-206. The segmentation algorithm of the MSDL system may identify various segments of the image that potentially contain objects of interest. Because the segmentation algorithm may employ a randomization technique for identifying the segments, a single pixel value may be in different segments.

Figure 3:
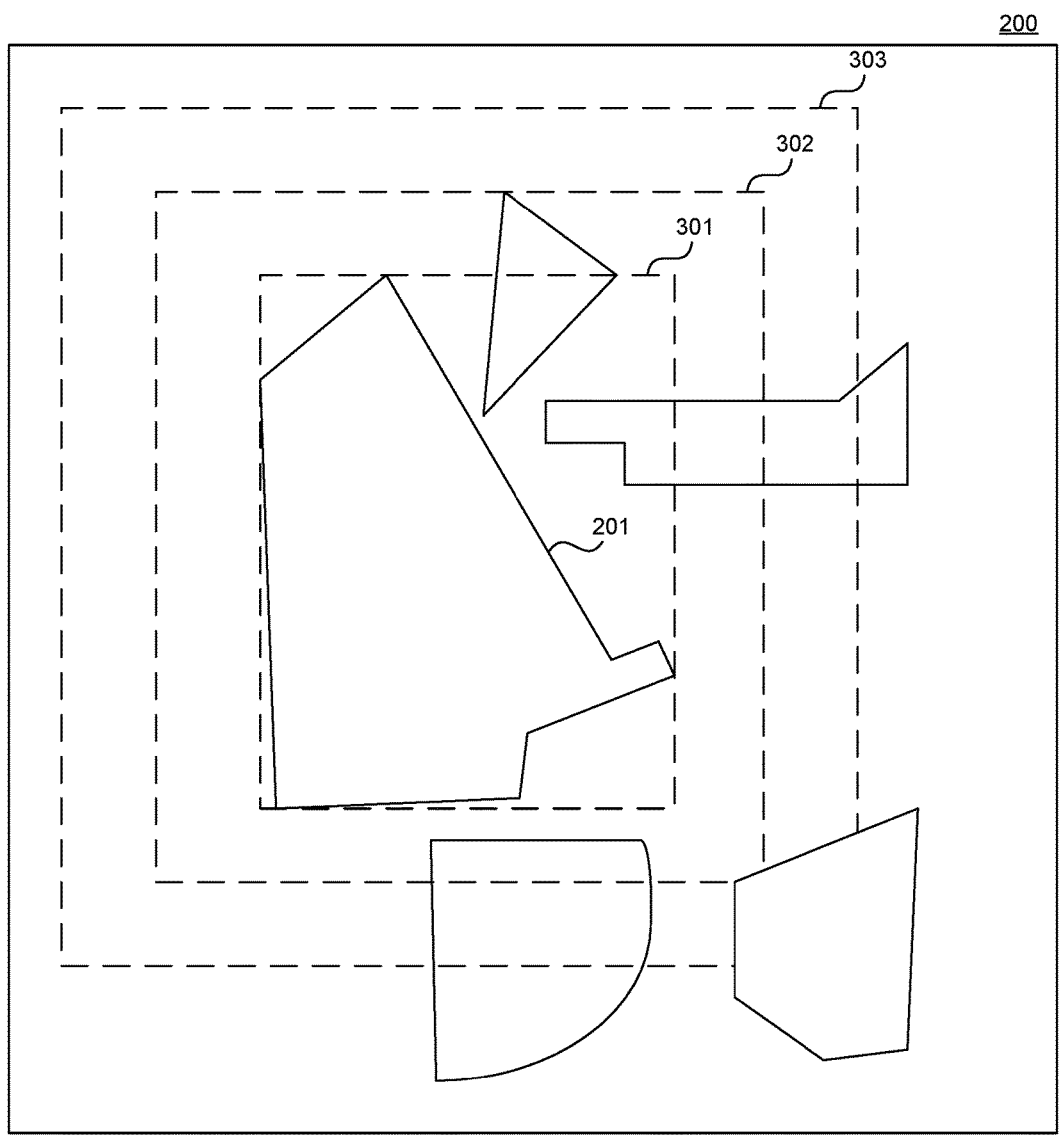
FIG. 3 illustrates one segment of a sample image.

FIG. 3 illustrates one segment of sample image 200. In this example, the MSDL system identifies object 201 as a segment. The MSDL system then identifies the bounding box for object 201. The MSDL system uses the bounding box as window 301 of the small window size. The MSDL system then uses a somewhat larger window size for the window 302 of the medium window size and an even larger window size for the window 303 of the large window size. The MSDL system may use various techniques for determining the medium and large window sizes. For example, the medium and large window sizes may be a fixed number of pixels larger than the small window size in each direction or may be a certain percentage larger than the small window size in each direction.

Figure 4:
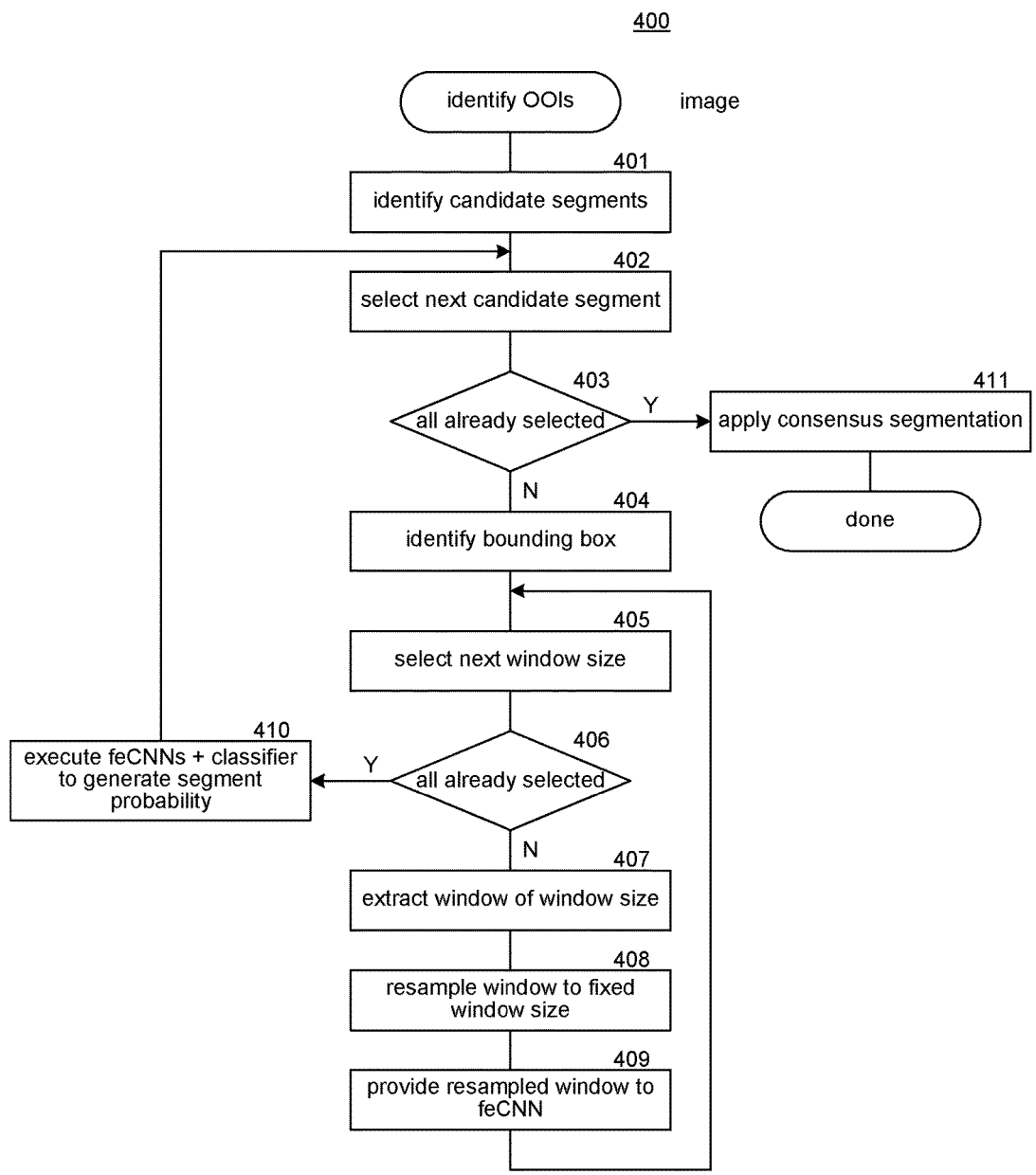
FIG. 4 is a flow diagram that illustrates the identification of regions of interest within an image in some embodiments.

FIG. 4 is a flow diagram that illustrates the identification of objects of interest within an image in some embodiments. An identify objects of interest ("OOIs") component 400 is passed an image. In block 401, the component identifies candidate segments of the image. The component generates multiple segmentations of the image by introducing variations in the selection (e.g., a randomization) of pixels to be merged into a candidate segment. For example, the component may generate four segmentations that each include 20, 25, 15, and 17 candidate segments, respectively. The MSDL system may use a very conservative approach to identify candidate segments so as not to miss any candidate segments that are part of actual objects of interest. In block 402, the component selects the next candidate segment. In decision block 403, if all the candidate segments have already been selected, then the component continues at block 411, else the component continues at block 404. In block 404, the component identifies the bounding box for the selected candidate segment. In blocks 405-409, the component extracts windows of various window sizes that include the bounding box. In block 405, the component selects the next window size. In decision block 406, if all the window sizes have already been selected, then the component continues at block 410, else the component continues at block 407. In block 407, the component extracts the window of the window size that includes the bounding box. In block 408, the component resamples the extracted window to the fixed window size for the feCNN associated with the selected window size. In block 409, the component provides the resampled window to that feCNN and loops to block 405 to select the next window size. In block 410, the component executes the feCNNs and the classifier to generate a segment probability that the segment contains a region of interest and loops to block 402 to select the next segment. In block 411, the component applies a consensus segmentation algorithm based on the probabilities to identify groups of pixels that likely form an object of interest and then completes.

The MSDL system may be employed to identify objects of interest of an image for many different types of applications. As described above, the MSDL system may be used for cancer screening and security. When used for cancer screening, the objects of interest of an image may be presented to a pathologist for further investigation and analysis, the objects of interest of a large number of images may be collected for further analysis such as to identify trends in the types of cancers in various population groups, and so on. When used for security, the objects of interest may be used to identify bags that contain prohibited items and flag the bags for enhanced inspection, save the objects of interest for further analysis (e.g., analysis of accuracy of manual screeners), and so on. For example, the enhanced inspection may include a manual inspection, a more detailed automated analysis that is tailored to the type of weapon identified by the MSDL system, and so on. The MSDL system may be used in industrial applications to identify defects during the manufacturing of the product. For example, the MSDL system may be used to detect defects during additive manufacturing, defects in a painting process, defects in materials, and so on. The MSDL system may be used to process images collected by a satellite or an aerial vehicle. For example, if the images are of a roadway, the MSDL system may be used to identify defects in the roadway. The MSDL system may be used to process existing collections of images to classify the images. For example, the MSDL system may be used to search for images that contain certain objects such as objects in frames of videos collected by surveillance cameras.

Figure 5:
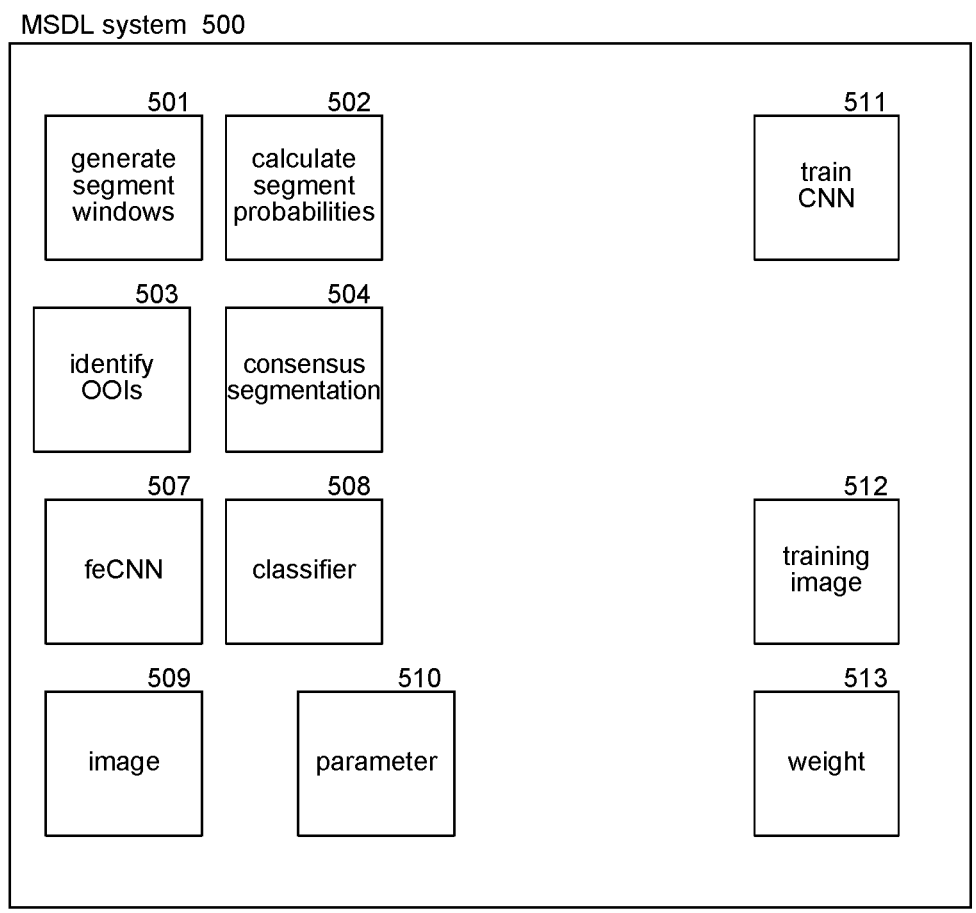
FIG. 5 is a block diagram illustrating components of the MSDL system in some embodiments.

FIG. 5 is a block diagram illustrating components of the MSDL system in some embodiments. The MSDL system 500 includes a generate segment windows component 501, a calculate segment probabilities component 502, an identify regions of interest component 503, a consensus segmentation component 504, an feCNN component 507, and a classifier component 508. The generate segment windows component 501 identifies segments of an image stored in an image store 509 and windows of varying sizes (i.e., multiple scales) for each segment. The calculate segment probabilities component 502 inputs the generated windows for each segment and employs the feCNN component and the classifier component to generate the segment probability for each segment. The identify regions of interest component 503 identifies groups of neighboring pixels by invoking the consensus segmentation component to identify objects of interest. The MSDL system includes a parameter store 510 that stores the parameters for the feCNNs. For example, the parameter store may store parameters indicating the fixed window size of each feCNN, the number of filters, the identification of the different types of layers and their connections, the number of nodes in the classifier, and so on. The MSDL system also includes a train CNN component 511 that inputs training images of a training image store 512 to learn filter weights that are then stored in a weight store 513.

The computing devices and systems on which the MSDL system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing devices may include desktop computers, laptops, tablets, e-readers, personal digital assistants, smartphones, gaming devices, servers, and computer systems such as massively parallel systems. The computing devices may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and include other storage means. The computer-readable storage media may have recorded upon or may be encoded with computer-executable instructions or logic that implements the MSDL system. The data transmission media is used for transmitting data via transitory, propagating signals or carrier waves (e.g., electromagnetism) via a wired or wireless connection.

The MSDL system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the system may be implemented in hardware using, for example, an application-specific integrated circuit ("ASIC").

Figure 6:
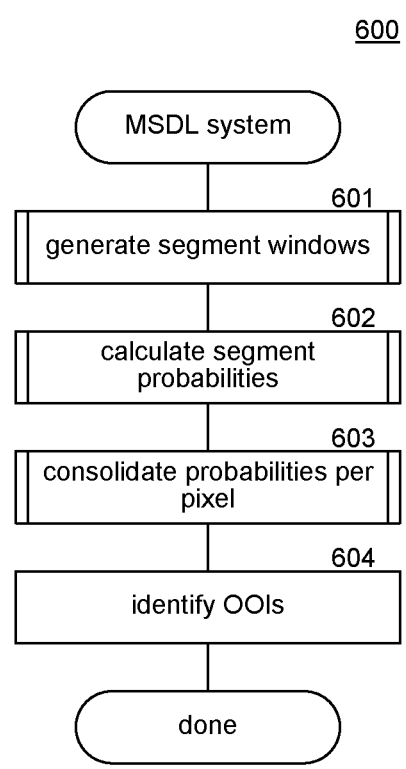
FIG. 6 is a flow diagram that illustrates the processing of the MSDL system in some embodiments.

FIG. 6 is a flow diagram that illustrates the processing of the MSDL system in some embodiments. The MSDL system 600 inputs an image and outputs the regions of interest within that image. In block 601, the component invokes the generate segment windows component to generate segmentations of an image and extract the segment windows. In block 602, the component invokes the calculate segment probabilities component to calculate the probability that each segment contains a region of interest. In block 603, the component invokes the consolidate probabilities per pixel component to collect the segment probabilities of each segment that contains the pixel. In block 604, the component identifies object of interest using a consensus segmentation component. The component then completes.

Figure 7:
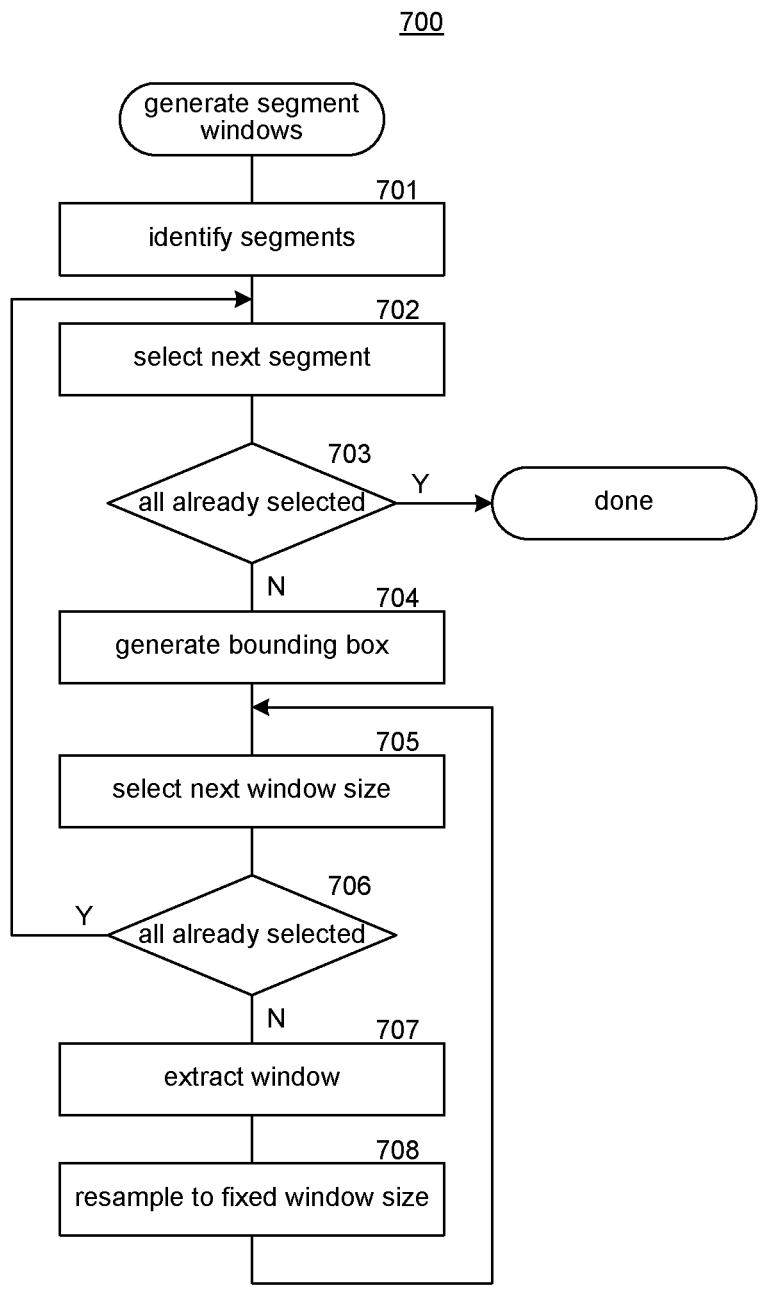
FIG. 7 is a flow diagram that illustrates the processing of a generate segment windows component in some embodiments.

FIG. 7 is a flow diagram that illustrates the processing of a generate segment windows component in some embodiments. A generate segment windows component 700 is invoked to generate segmentations of an image and identify the windows for each segment. In block 701, the component identifies the segments of the image, for example by performing multiple segmentations of the image. In block 702, the component selects the next segment. In decision block 703, if all the segments have already been selected, then the component completes, else the component continues at block 704. In block 704, the component generates the bounding box for the selected segment. In block 705, the component selects the next window size that includes the bounding box. In decision block 706, if all the window sizes have already been selected, then the component loops to block 702 to select the next segment, else the component continues at block 707. In block 707, the component extracts the window of the selected window size from the image. In block 708, the component resamples the window to the fixed window size and then loops to block 705 to select the next window size.

Figure 8:
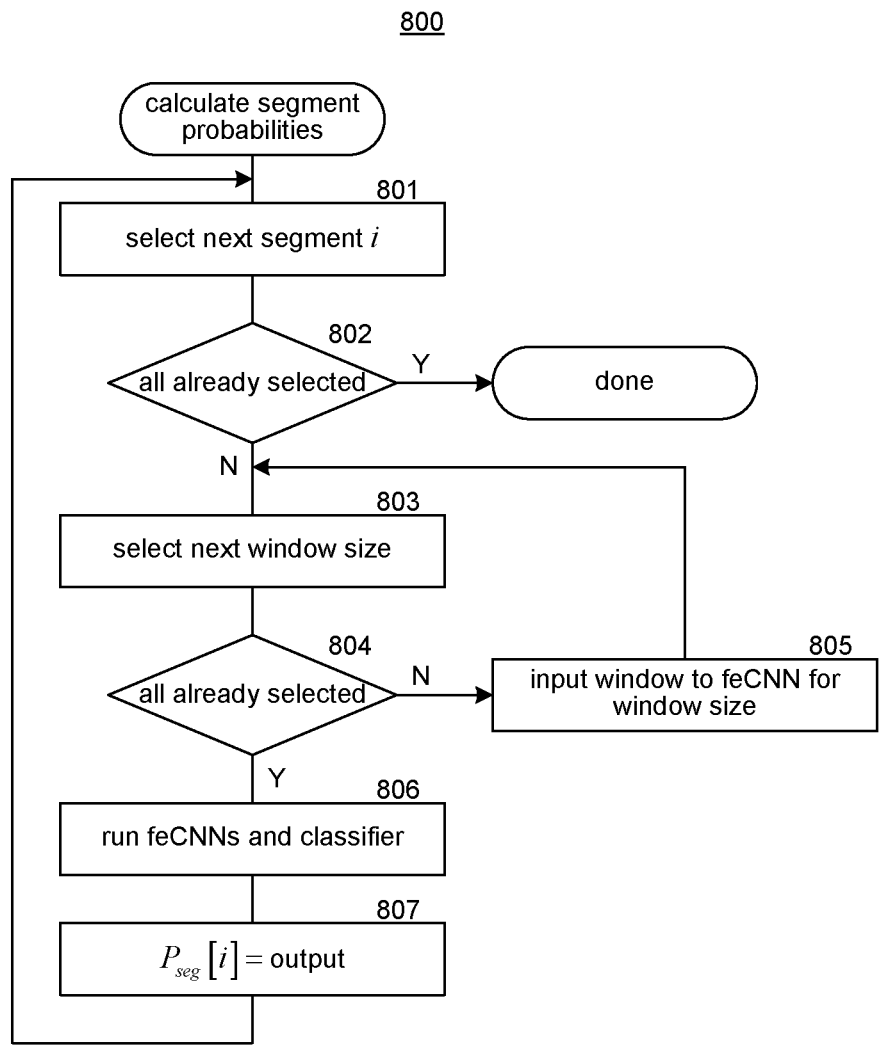
FIG. 8 is a flow diagram that illustrates the processing of a calculate segment probabilities component in some embodiments.

FIG. 8 is a flow diagram that illustrates the processing of a calculate segment probabilities component in some embodiments. A calculate segment probabilities component 800 is invoked to calculate the probability that each segment is a region of interest. In block 801, the component selects the next segment i. In decision block 802, if all the segments have already been selected, then the component completes, else the component continues at block 803. In block 803, the component selects the next window size for the segment. In decision block 804, if all the window sizes have already been selected, then the component continues at block 806, else the component continues at block 805. In block 805, the component provides the window of the select window size to the feCNN for the selected window size and then loops to block 803 to select the next window size. In block 806, the component runs the feCNNs and the classifier to generate a segment probability. In block 807, the component stores the output of the classifier as the segment probability $P_{seg}[i]$ and then loops to block 801 to select the next segment.

The following paragraphs describe various embodiments of aspects of the MSDL system. An implementation of the MSDL system may employ any combination of the embodiments. The processing described below may be performed by a computing device with a processor that executes computer-executable instructions stored on a computer-readable storage medium that implements the MSDL system.

In some embodiments, a method performed by a computing system is provided. The method for each of a plurality of segments of an image performs the following. The method identifies identifying a bounding box for that segment. For each of a plurality of window sizes, the method extracts a window of that window size that includes the bounding box, resamples the extracted window to a window of a fixed window size, and provides the window of that window size for the segment as input to a feature extracting convolutional neural network ("feCNN") for that window size. The method executes the feCNNs to extract features for each window and then executes a classifier with the extracted features of the feCNNs as inputs to generate a segment probability that the segment relates to an object of interest. In some embodiments, the meth further generates a pixel probability for pixels of the image. The pixel probability for a pixel indicates that that pixel is within an object of interest based on the segment probabilities of segments that contain that pixel. In some embodiments, the method further identifies objects of interest based on the pixel probabilities of neighboring pixels. In some embodiments, the image is a three-dimensional image, the pixels are voxels, and the window is a volume. In some embodiments, the classifier is a support vector machine. In some embodiments, an feCNN includes a convolution layer, a rectified linear unit layer, a pooling layer, and a fully connected layer, and the fully connected layer outputs the extracted feature values. In some embodiments, the method further identifies the segments based on multiple segmentations of the image. In some embodiments, the feCNNs and the classifier are trained using training data that includes images with objects of interest identified. In some embodiments, the image is a scan of a container. In some embodiments, the image is an aerial view of a portion of the earth. In some embodiments, the image is a computed-tomography image of a person. In some embodiments, the method further, after generating the segment probabilities, applies a consensus segmentation algorithm to identity objects of interest.

In some embodiments, a computing system is provided. The computing system comprises one or more computer-readable storage mediums storing computer-executable instructions and one or more processors for executing the computer-executable instructions stored in the one or more computer-readable storage mediums. The instructions control the computing system to provide a multi-scale neural network with a feature extracting convolutional neural network ("feCNN") for each of a plurality of window sizes and a classifier that inputs features of a segment of an image extracted by the feCNNs and generates a probability that that segment relates to an object of interest. The instructions control the computing system to perform a segmentation of an image to identify segments of the image. The instructions control the computing system to, for each of a plurality of the identified segments, perform the following. The instructions control the computing system to, for each of the window sizes, extract a window of that window size that includes a bounding box for the segment, resample the extracted window to a window of a fixed window size, and provide the window of the fixed window size as input to the feCNN for that window size. The instructions control the computing system to execute the multi-scale neural network to generate a segment probability that the segment relates to an object of interest. In some embodiments, the classifier is a conventional fully connected layer that inputs the output of the feCNNs. In some embodiments, the instructions further control the computing system to generate a pixel probability for pixels of the image. The pixel probability for a pixel indicates that that pixel is within an object of interest based on the segment probabilities of segments that contain that pixel. In some embodiments, the instructions further control the computing system to identify objects of interest based on a consensus segmentation algorithm. In some embodiments, a window size encompasses all smaller window sizes.

In some embodiments, one or more computer-readable storage mediums storing computer-executable instructions are provided. The instructions control a computing system to generate segmentations of an image to identify segments of the image. The instructions control the computing system, for each of a plurality of segments, as follows. The instructions control a computing system to identify a bounding box for that segment. For each of a plurality of window sizes, the instructions control the computing system to extract a window of that window size that includes the bounding box for the segment, resample the extracted window to a window of a fixed window size, provide the extracted window as input to a feature extracting convolutional neural network ("feCNN") for that window size, and execute the feCNN for that window size to extract features of the segment for that window size. The instructions control the computing system to execute a classifier with the extracted features of the feCNNs as inputs to generate a segment score indicating whether the segment relates to an object of interest. After performing the above for each of a plurality of window sizes, the instructions control the computing system to generate a pixel score for pixels of the image. The pixel score for a pixel indicating that that pixel is within an object of interest based on the segment scores of segments that contain that pixel. The instructions control the computing system to identify objects of interest based on the pixel scores of neighboring pixels. In some embodiments, a window size encompasses all smaller window sizes.

In some embodiments, a method performed by a computing system is provided. The method accesses accessing a plurality of images. For each image, the method performs segmentations of the image to identify segments of the image. For each of a plurality of segments of the image, the method generates a label to indicate whether that segment relates to an object of interest, identifies a bounding box for that segment, and, for each of a plurality of window sizes, generates a window of a fixed window size by extracting a window of that window size that includes the bounding box and resampling the extracted window to the window of the fixed window size. The method then trains a multi-scale neural network that includes a feature extracting convolutional neural network ("feCNN") for each window size and a classifier that inputs the extracted features for each window size to generate a segment score that indicates whether a segment relates to an object of interest. The multi-scale neural network is trained using, for each segment, the windows of the window sizes and the label for that segment. In some embodiments, the training is based on the identification of objects of interest for an image based on a pixel score of pixels of the images that is derived from segment scores of segments that contain that pixel. In some embodiments, the training is further based on objects of interest that are identified based on pixel scores of neighboring pixels.

In some embodiments, a method performed by a computing system is provided. The method identifies segments of an image. For each segment, the method generates a segment score by inputting to a multi-scale neural network windows of multiple scales that include the segment and that have been resampled to a fixed window size. The method generates a pixel score for pixels of the image. The pixel score for a pixel indicating that that pixel is within an object of interest based on the segment scores of segments that contain that pixel. The method identifies objects of interest based on the pixel scores of neighboring pixels. In some embodiments, the multi-scale neural network includes a feature extracting convolutional neural network ("feCNN") for each scale and a classifier that inputs each feature of each feCNN. In some embodiments, the classifier is a fully connected layer with nodes that are each connected to each feature of each feCNN. In some embodiments, the classifier is a support vector machine.

In some embodiments, a computing system that includes a multi-scale neural network for classifying an area of an image is provided. The computing system comprises, for each scale, a feature extracting convolutional neural network ("feCNN") that inputs a window of a fixed window size derived from the area of the image, wherein each scale corresponds to a window of a different window size that encompasses the area, and wherein the feCNN extracts feature values from the window. The computing system comprises a classifier that inputs each extracted feature values of each feCNN to generate a classification for the window. In some embodiments, the window that is input to an feCNN is a resampling of the window of a window size to the fixed window size. In some embodiments, an feCNN includes a convolution layer, a rectified linear unit layer, a pooling layer, and a fully connected layer, and the fully connected layer outputs the extracted feature values. In some embodiments, the classifier includes a node for each classification and each node is connected to the extracted feature values of each feCNN.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method performed by a computing system, the method comprising, for each of a plurality of segments of an image:
   identifying a bounding box for the segment;
   for each of a plurality of window sizes,
      extracting a window of that window size that includes the bounding box;
      resampling the extracted window to a resampled window of a fixed window size; and
      providing the resampled window of the fixed window size for the segment as input to a feature extracting convolutional neural network ("feCNN") for that window size;
   executing the feCNNs to extract features for each resampled window; and
   executing a classifier with the extracted features of the feCNNs as inputs to generate a segment probability that the segment relates to an object of interest.

2. The method of claim 1 further comprising generating a pixel probability for pixels of the image, the pixel probability for a pixel indicating that that pixel is within an object of interest based on the segment probabilities of segments that contain that pixel.

3. The method of claim 2 further comprising identifying objects of interest based on the pixel probabilities of neighboring pixels.

4. The method of claim 2 wherein the image is a three-dimensional image, the pixels are voxels, and the window is a volume.

5. The method of claim 1 wherein the classifier is a support vector machine.

6. The method of claim 1 wherein an feCNN includes a convolution layer, a rectified linear unit layer, a pooling layer, and a fully connected layer, and the fully connected layer outputs the extracted feature values.

7. The method of claim 1 further comprising identifying the segments based on multiple segmentations of the image.

8. The method of claim 1 wherein the feCNNs and the classifier are trained using training data that includes images with objects of interest identified.

9. The method of claim 1 wherein the image is a scan of a container.

10. The method of claim 1 wherein the image is an aerial view of a portion of the earth.

11. The method of claim 1 wherein the image is a computed-tomography image of a person.

12. The method of claim 1 further comprising, after generating the segment probabilities, applying a consensus segmentation algorithm to identity objects of interest.

13. The method of claim 1 wherein at least two window sizes have fixed window sizes that are different sizes.

14. A computing system comprising:
   one or more computer-readable storage mediums storing computer-executable instructions for controlling the computing system to:
      access a multi-scale neural network with a feature extracting convolutional neural network ("feCNN") for each of a plurality of window sizes and a classifier that inputs features of a segment of an image extracted by the feCNNs and generates a probability that that segment relates to an object of interest;
      perform a segmentation of an image to identify segments of the image;
      for each of a plurality of the identified segments,
         for each of the window sizes,
            extract an extracted window of that window size that includes a bounding box for the identified segment;
            resample the extracted window to a resampled window of a fixed window size; and
            provide the resampled window of the fixed window size as input to the feCNN for that window size; and
         execute the multi-scale neural network to generate a segment probability that the segment relates to an object of interest; and
   one or more processors for executing the computer-executable instructions stored in the one or more computer-readable storage mediums.

15. The computing system of claim 14 wherein the classifier is a conventional fully connected layer that inputs the output of the feCNNs.

16. The computing system of claim 14 wherein the computer-executable instructions further control the computing system to generate a pixel probability for pixels of the image, the pixel probability for a pixel indicating that that pixel is within an object of interest based on the segment probabilities of segments that contain that pixel.

17. The computing system of claim 16 wherein the computer-executable instructions further control the computing system to identify objects of interest based on a consensus segmentation algorithm.

18. The computing system of claim 14 wherein a window size encompasses all smaller window sizes.

19. The computing system of claim 14 wherein at least two window sizes have fixed window sizes that are different sizes.

20. One or more computer-readable storage mediums storing computer-executable instructions that, when executed, control a computing system to:
  generate segmentations of an image to identify segments of the image;
  for each of a plurality of segments,
    identify a bounding box for that segment;
    for each of a plurality of window sizes,
      extract a window of that window size that includes the bounding box for the segment;
      resample the extracted window to a resampled window of a fixed window size;
      provide the resampled window as input to a feature extracting convolutional neural network ("feCNN") for that window size; and
      execute the feCNN for that window size to extract features of the segment for that window size; and
    execute a classifier with the extracted features of the feCNNs as inputs to generate a segment score indicating whether the segment relates to an object of interest;
  generate a pixel score for pixels of the image, the pixel score for a pixel indicating that that pixel is within an object of interest based on the segment scores of segments that contain that pixel; and
  identify objects of interest based on the pixel scores of neighboring pixels.

21. The one or more computer-readable storage mediums of claim 20 wherein a window size encompasses all smaller window sizes.

22. One or more computer-readable storage mediums of claim 20 wherein at least two window sizes have fixed window sizes that are different sizes.

23. A method performed by a computing system, the method comprising:
  accessing a plurality of images;
  for each image,
    performing segmentations of the image to identify segments of the image;
    for each of a plurality of segments of the image:
      generating a label to indicate whether that segment relates to an object of interest;
      identifying a bounding box for that segment; and
      for each of a plurality of window sizes, generating a window of a fixed window size by extracting a window of that window size that includes the bounding box and resampling the extracted window to the window of the fixed window size; and
  training a multi-scale neural network that includes a feature extracting convolutional neural network ("feCNN") for each window size and a classifier that inputs the extracted features for each window size to generate a segment score that indicates whether a segment relates to an object of interest, the multi-scale neural network being trained using, for each segment, the windows of the window sizes and the label for that segment.

24. The method of claim 23 wherein the training is based on the identification of objects of interest for an image based on a pixel score of pixels of the images that is derived from segment scores of segments that contain that pixel.

25. The method of claim 24 wherein the training is further based on objects of interest that are identified based on pixel scores of neighboring pixels.

26. The method of claim 23 wherein at least two window sizes have fixed window sizes that are different sizes.

27. A method performed by a computing system, the method comprising:
  identifying segments of an image;
  for each segment, generating a segment score by inputting to a multi-scale neural network windows of multiple scales that include the segment and that have been resampled to a fixed window size;
  generating a pixel score for pixels of the image, the pixel score for a pixel indicating that that pixel is within an object of interest based on the segment scores of segments that contain that pixel; and
  identifying objects of interest based on the pixel scores of neighboring pixels.

28. The method of claim 27 wherein the multi-scale neural network includes a feature extracting convolutional neural network ("feCNN") for each scale and a classifier that inputs each feature of each feCNN.

29. The method of claim 28 wherein the classifier is a fully connected layer with nodes that are each connected to each feature of each feCNN.

30. The method of claim 28 wherein the classifier is a support vector machine.

31. A computing system that includes a multi-scale neural network for classifying an area of an image, the computing system comprising:
  one or more computer-readable storage mediums storing computer-executable instructions of controlling the computing system to:
    for each scale, a feature extracting convolutional neural network ("feCNN") that inputs a window of a fixed window size derived from an area of the image, wherein each scale corresponds to a window of a different window size that encompasses the area, and wherein the feCNN extracts feature values from the window; and
    a classifier that inputs each extracted feature values of each feCNN to generate a classification for the window; and
  one or more processors for executing the computer-executable instructions stored in the one or more computer-readable storage mediums.

32. The computing system of claim 31 wherein the window that is input to an feCNN is a resampling of the window of a window size to the fixed window size.

33. The computing system of claim 31 wherein an feCNN includes a convolution layer, a rectified linear unit layer, a pooling layer, and a fully connected layer, and the fully connected layer outputs the extracted feature values.

34. The computing system of claim 31 wherein the classifier includes a node for each classification and each node is connected to the extracted feature values of each feCNN.

* * * * *